US011669530B2

(12) United States Patent
Long et al.

(10) Patent No.: US 11,669,530 B2
(45) Date of Patent: Jun. 6, 2023

(54) INFORMATION PUSH METHOD AND APPARATUS, DEVICE, AND STORAGE MEDIUM

(71) Applicant: BAIDU ONLINE NETWORK TECHNOLOGY (BEIJING) CO., LTD., Beijing (CN)

(72) Inventors: Xiuyun Long, Beijing (CN); Huipeng Li, Beijing (CN); Lihong Liu, Beijing (CN); Jiahui Liu, Beijing (CN); Hongsheng Yang, Beijing (CN); Yuqi Lu, Beijing (CN)

(73) Assignee: BAIDU ONLINE NETWORK TECHNOLOGY (BEIJING) CO., LTD.

( * ) Notice: Subject to any disclaimer, the term of this patent is extended or adjusted under 35 U.S.C. 154(b) by 0 days.

(21) Appl. No.: 17/207,844

(22) Filed: Mar. 22, 2021

(65) Prior Publication Data
US 2021/0209122 A1    Jul. 8, 2021

Related U.S. Application Data

(63) Continuation of application No. PCT/CN2020/105750, filed on Jul. 30, 2020.

(30) Foreign Application Priority Data

Mar. 31, 2020    (CN) .......................... 202010246479.2

(51) Int. Cl.
*G06F 16/2457*    (2019.01)
*H04L 67/55*    (2022.01)

(52) U.S. Cl.
CPC ........ *G06F 16/24578* (2019.01); *H04L 67/55* (2022.05)

(58) Field of Classification Search
CPC ........................... G06F 16/24578; H04L 67/26
(Continued)

(56) References Cited

U.S. PATENT DOCUMENTS 10,459,927 B1 *    10/2019    Gregory ............... H04L 67/535
10,572,925 B1 *    2/2020    Roy Chowdhury ........................
                                                    G06F 16/24578
(Continued)

FOREIGN PATENT DOCUMENTS

CN    106294497 A    1/2017
CN    106339469 A    1/2017
(Continued)

OTHER PUBLICATIONS

First Office Action in CN Patent Application No. 2020102464798.2 dated Dec. 13, 2022.
(Continued)

*Primary Examiner* — Hosain T Alam
*Assistant Examiner* — Saba Ahmed
(74) *Attorney, Agent, or Firm* — Dilworth IP, LLC (57) ABSTRACT

The present application discloses an information push method and apparatus, a device, and a storage medium, which relate to the field of intelligent search technology. A specific implementation of the method in the present application lies in: acquiring a user feature and an item feature, where both the user feature and the item feature include click through rate information; determining a degree of similarity between the user feature and the item feature; determining, according to the degree of similarity, item information that is recalled; and pushing the item information to a user terminal. According to the present application, item information having a high click through rate may be acquired through a one-channel recall approach, so that information push efficiency is improved and the pushed item information better conforms to user needs.

20 Claims, 3 Drawing Sheets

(58) Field of Classification Search
USPC .......................................................... 707/769
See application file for complete search history.

(56) References Cited

U.S. PATENT DOCUMENTS

| | | | |
|---|---|---|---|
| 11,216,843 B1* | 1/2022 | Roy Chowdhury | ........................ G06F 16/24578 |
| 2015/0088911 A1 | 3/2015 | Qiao et al. | |
| 2017/0105048 A1* | 4/2017 | Stein | ........................ G06F 16/48 |
| 2017/0118304 A1 | 4/2017 | Ratiu et al. | |
| 2019/0073586 A1* | 3/2019 | Chen | ........................ G06N 7/005 |
| 2019/0073590 A1* | 3/2019 | Wu | ........................ G06F 9/52 |

FOREIGN PATENT DOCUMENTS

| CN | 107038226 A | 8/2017 |
|---|---|---|
| CN | 108090162 A | 5/2018 |
| CN | 108182621 A | 6/2018 |
| CN | 108259546 A | 7/2018 |
| CN | 109919651 A | 6/2019 |
| CN | 109982155 A | 7/2019 |
| CN | 110046304 A | 7/2019 |
| CN | 110119477 A | 8/2019 |
| CN | 110162690 A | 8/2019 |
| CN | 110162700 A | 8/2019 |
| CN | 110489644 A | 11/2019 |
| CN | 110516152 A | 11/2019 |
| CN | 110781321 A | 2/2020 |
| CN | 110910199 A | 3/2020 |

OTHER PUBLICATIONS

European Search Report in EP Patent Application No. 20864259.5 dated Mar. 15, 2022.
First Office Action in JP Patent Application No. 2021-517934 dated Jul. 13, 2022.
International Search Report in International Application No. PCT/CN2020/105750 dated Dec. 31. 2020.

* cited by examiner

INFORMATION PUSH METHOD AND APPARATUS, DEVICE, AND STORAGE MEDIUM

CROSS-REFERENCE TO RELATED APPLICATIONS

The present application is a continuation of International Application No. PCT/CN2020/105750, filed on Jul. 30, 2020, which claims priority to Chinese Patent Application No. 202010246479.2, filed on Mar. 31, 2020, entitled "INFORMATION PUSH METHOD AND APPARATUS, DEVICE, AND STORAGE MEDIUM", which are incorporated herein by reference in their entireties.

TECHNICAL FIELD

The present application relates to the intelligent search technology in the field of data processing technologies and, in particular, to an information push method and apparatus, a device, and a storage medium.

BACKGROUND

With the rapid development of Internet technologies, there is also a rapid increase in information quantity, which has also increased the difficulty for users to obtain information that meets their own needs.

In the prior art, a typical approach is to: construct multiple channels of recall models, search item information matching a user feature through a respective channel of recall model, then perform comprehensive scoring and ranking on the item information recalled through respective channels, and finally push top-ranked item information to the users.

However, this approach requires construction of multiple recall models, and item information recalled through respective channels cannot be directly compared. Target item information can be obtained only with complex analysis and ranking, and thus the entire push procedure is cumbersome and inefficient.

SUMMARY

The present application provides an information push method and apparatus, a device, and a storage medium, according to which item information having a high click through rate may be acquired through a one-channel recall approach, so that information push efficiency is improved and the pushed item information better conforms to user needs.

In a first aspect, an embodiment of the present application provides an information push method including:

acquiring a user feature and an item feature, where both the user feature and the item feature include click through rate information;

determining a degree of similarity between the user feature and the item feature;

determining, according to the degree of similarity, item information that is recalled; and pushing the item information to a user terminal.

This embodiment allows for: acquiring a user feature and an item feature that both include click through rate information, then determining a degree of similarity between the user feature and the item feature; determining, according to the degree of similarity, item information that is recalled; and pushing the item information to a user terminal. Therefore, item information having a high click through rate may be acquired through a one-channel recall approach, so that information push efficiency is improved and the pushed item information better conforms to user needs.

In a second aspect, an embodiment of the present application provides an information push apparatus, including:

an acquiring module, configured to acquire a user feature and an item feature, where both the user feature and the item feature include click through rate information;

a first determining module, configured to determine a degree of similarity between the user feature and the item feature;

a second determining module, configured to determine, according to the degree of similarity, item information that is recalled; and a transmitting module, configured to push the item information to a user terminal.

This embodiment allows for: acquiring a user feature and an item feature that both include click through rate information, then determining a degree of similarity between the user feature and the item feature; determining, according to the degree of similarity, item information that is recalled; and pushing the item information to a user terminal. Therefore, item information having a high click through rate may be acquired through a one-channel recall approach, so that information push efficiency is improved and the pushed item information better conforms to user needs.

In a third aspect, the preset application provides an electronic device including a processor and a memory, where the memory is stored with executable instructions of the processor, and where the processor is configured to execute the information push method described in any implementation of the first aspect by executing the executable instructions.

In a fourth aspect, the present application provides a computer readable storage medium having, stored thereon, computer instructions which, when executed by a processor, execute the information push method described in any implementation of the first aspect.

In a fifth aspect, an embodiment of the present application provides a program product including a computer program, where the computer program is stored in a readable storage medium from which at least one processor of a server can read the computer program, and the at least one processor executes the computer program to enable the server to execute the information push method described in any implementation of the first aspect.

In a sixth aspect, an embodiment of the present application provides an information push method including:

determining a degree of similarity between a user feature and an item feature, where both the user feature and the item feature include click through rate information;

determining, according to the degree of similarity, item information that is recalled; and pushing the item information to a user terminal.

In a seventh aspect, an embodiment of the present application provides a computer program including program codes, where when a computer runs the computer program, the program codes execute the information push method described in any implementation of the first aspect or the information push method described in the sixth aspect.

This embodiment allows for: acquiring a user feature and an item feature that both include click through rate information, then determining a degree of similarity between the user feature and the item feature; determining, according to the degree of similarity, item information that is recalled; and pushing the item information to a user terminal. Therefore, item information having a high click through rate may be acquired through a one-channel recall approach, so that information push efficiency is improved and the pushed item information better conforms to user needs.

An embodiment of the above application has the following advantages or beneficial effects: item information having a high click through rate may be acquired through a one-channel recall approach, so that information push efficiency is improved and the pushed item information better conforms to user needs. The following technical means is used in terms of acquiring a user feature and an item feature, where both the user feature and the item feature include click through rate information; determining a degree of similarity between the user feature and the item feature; determining, according to the degree of similarity, item information that is recalled; and pushing the item information to a user terminal, thereby overcoming the technical problem that the existing information push method is cumbersome and inefficient in procedure, and achieving a technical effect that item information having a high click through rate is acquired so that information push efficiency is improved and the pushed item information better conforms to user needs.

Other technical effects of the above optional manners will be described hereunder in conjunction with specific embodiments.

BRIEF DESCRIPTION OF DRAWINGS

The accompanying drawings are used to better understand the present solution, but do not constitute a limitation to the present application. Among them.

DESCRIPTION OF EMBODIMENTS

Exemplary embodiments of the present application will be described hereunder with reference to the accompanying drawings, which include therein various details of the embodiments of the present application to facilitate understanding, and should be considered as to be merely exemplary. Therefore, those of ordinary skill in the art should realize that various changes and modifications can be made to the embodiments described herein without departing from the scope and spirit of the present application. Likewise, for clarity and conciseness, descriptions of well-known functions and structures are omitted in the following description.

Exemplary embodiments of the present application will be described hereunder with reference to the accompanying drawings, which include therein various details of the embodiments of the present application to facilitate understanding, and should be considered as to be merely exemplary. Therefore, those of ordinary skill in the art should realize that various changes and modifications can be made to the embodiments described herein without departing from the scope and spirit of the present application. Likewise, for clarity and conciseness, descriptions of well-known functions and structures are omitted in the following description.

The terms "first", "second", "third", "fourth", or the like (if exist) in the specification and claims of the present application and the above-mentioned accompanying drawings are used to distinguish similar objects, but not necessarily intended to describe a specific order or sequence. It should be understood that the data used in this way is interchangeable under appropriate circumstances, so that the embodiments of the present application described herein, for example, can be implemented in an order other than those illustrated or described herein. In addition, the terms "including" and "having" and any variations of them are intended to cover non-exclusive inclusions. For example, processes, methods, systems, products, or devices including a series of steps or units are not necessarily limited to steps or units that are clearly listed, but may include other steps or units that are not clearly listed or inherent to these processes, methods, products or devices.

The following is a detailed description of the technical solution of the present application with specific embodiments. The following specific embodiments may be combined with each other, and the same or similar concepts or processes may not be repeated in some embodiments.

With the rapid development of Internet technologies, there is also a rapid increase in information quantity, which has also increased the difficulty for users to obtain information that meets their own needs. In the prior art, a typical approach is to: construct multiple channels of recall models, search item information matching a user feature through a respective channel of recall model, then perform comprehensive scoring and ranking on the item information recalled through respective channels, and finally push top-ranked item information to the users. However, this approach requires construction of multiple recall models, and item information recalled through respective channels cannot be directly compared. Target item information can be obtained only with complex analysis and ranking, and thus the entire push procedure is cumbersome and inefficient.

In light of the above technical problem, the present application provides an information push method and apparatus, a device, and a storage medium, which relate to the intelligent search technology in the field of data processing technologies, and according to which item information having a high click through rate (Click Through Rate, CTR) may be acquired through a one-channel recall approach, so that information push efficiency is improved and the pushed item information better conforms to user needs.

Figure 1:
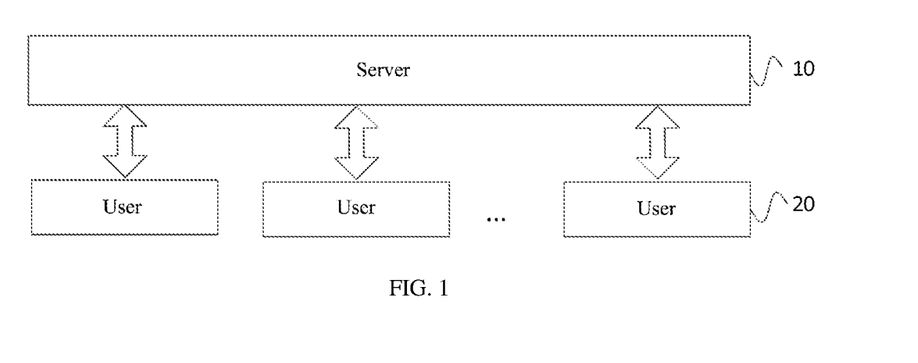
FIG. 1 is a schematic diagram of principles of an information push method that can implement an embodiment of the present application.

FIG. 1 is a schematic diagram of principles of an information push method that can implement an embodiment of the present application. As shown in FIG. 1, a server 10 and users 20 are included. The server 10 in the drawing can also be other computer or virtual machine with data analysis and processing capabilities. In the prior art, lack of a CTR signal in the recall procedure renders that a recalled item may not necessarily have a high CTR, leading to many invalid recalls. In the present application, the CTR signal is prepositioned to the recall stage so that an item having a high click rate can be effectively recalled. First, the server 10 acquires a user feature and an item feature, where both the user feature and the item feature include click through rate information. Specifically, the server 10 may determine the user feature according to user portrait data and user behavior data, such as a historical browsing record, favorite record, and purchasing record. The user portrait data may be gender, age, education level, consumption level, asset status, life stage, residential business district, occupation, etc. Exemplarily, a user's CTR information may be statistically obtained according to a browsing record, a favorite record, and a purchasing record in the behavior data, and an item's CTR information may be statistically obtained according to a browsing level, a forwarding level, and a favorite level in item data. A feature reflecting a point of interest of the user and a user attribute may be obtained according to the user behavior data and the user portrait data, so that item information matching the user feature can be found subsequently, thereby achieving accurate information push. The server 10 may also determine the item feature according to the item data (which may come from various major databases). Taking informational information as an example, any one or more of informational category, title, abstract, author information, browsing level, forwarding level, and favorite level may be obtained. The item feature reflecting the item information may be quickly constructed according to the item data, so that the item information that matches the user feature can be found subsequently, thereby achieving accurate information push. Then, the server 10 may vectorize the user feature and the item feature, and then calculate a degree of similarity between the user feature and the item feature according to a trained model. Finally, the server 10 acquires item information corresponding to an item feature whose degree of similarity is ranked at top N, and may use these pieces of item information as target items for recommendation to the user.

It should be noted that the server in the present application may acquire multiple user features and item features simultaneously, and push corresponding item information to different users according to degrees of similarity.

The application of the above method overcomes the technical problem that the existing information push method is cumbersome and inefficient in procedure, and thus item information having a high CTR may be acquired through a one-channel recall approach, so that information push efficiency is improved and the pushed item information better conforms to user needs.

Figure 2:
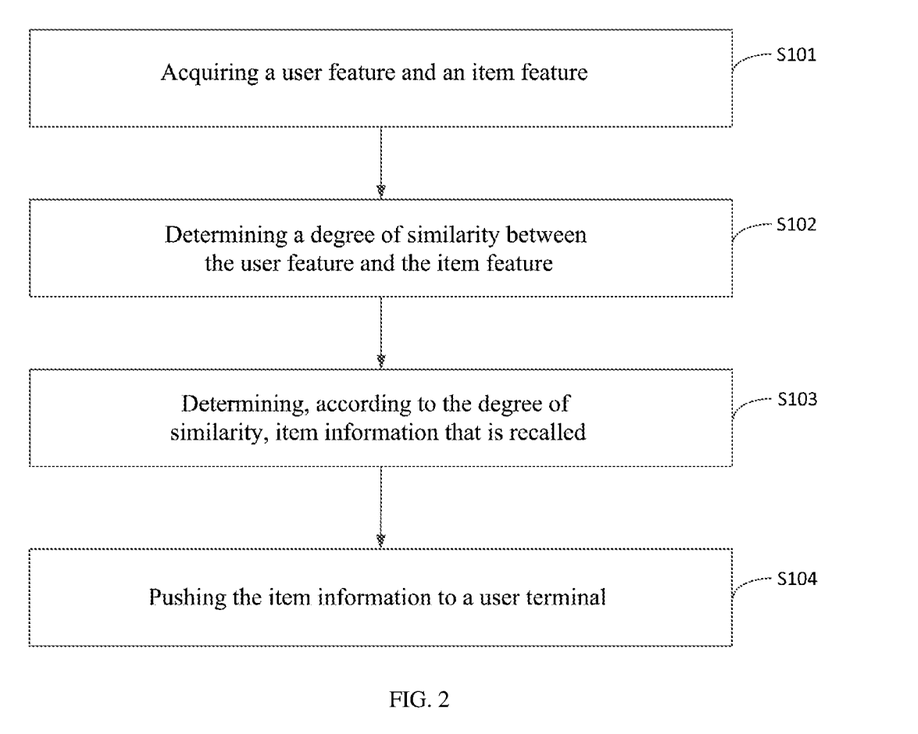
FIG. 2 is a schematic diagram according to a first embodiment of the present application.

FIG. 2 is a schematic diagram according to a first embodiment of the present application. As shown in FIG. 2, the method in this embodiment may include:

S101, acquiring a user feature and an item feature;

S102, determining a degree of similarity between the user feature and the item feature;

S103, determining, according to the degree of similarity, item information that is recalled; and S104, pushing the item information to a user terminal.

In this embodiment, Step S101 allows for first acquiring a user feature and an item feature, where both the user feature and the item feature include click through rate information.

Specifically, if a CTR signal is lacked in the recall procedure, then a recalled item may not necessarily have a high CTR, leading to many invalid recalls. In the present application, the CTR signal is prepositioned to the recall stage so that an item having a high click rate can be effectively recalled. This approach can effectively improve information push efficiency, so that the pushed item information better conforms to user needs.

This embodiment allows for: acquiring a user feature and an item feature that both include click through rate CTR information, then determining a degree of similarity between the user feature and the item feature; determining, according to the degree of similarity, item information that is recalled; and pushing the item information to a user terminal. Therefore, item information having a high CTR may be acquired through a one-channel recall approach, so that information push efficiency is improved and the pushed item information better conforms to user needs.

Exemplarily, the acquiring the user feature in Step S101 includes: determining the user feature according to user behavior data and user portrait data. Optionally, the user behavior data includes a browsing record, a favorite record, and a purchasing record; and the user portrait data includes any one or more of: age, gender, education level, consumption level, and occupation type. CTR information of a user may be statistically obtained according to the browsing record, the favorite record, and the purchasing record in the behavior data. It should be noted that the user behavior data is not limited in this embodiment with regard to its specific data type and quantity, and those skilled in the art can make an adjustment to data for statistically obtaining the user's CTR information, if required.

In this embodiment, the user feature may be determined according to user portrait data and user behavior data, such as a historical browsing record, favorite record, and purchasing record. The user portrait data may be gender, age, education level, consumption level, asset status, life stage, residential business district, occupation, etc. A feature reflecting a point of interest of the user and a user attribute may be obtained according to the user behavior data and the user portrait data, so that item information matching the user feature can be found subsequently, thereby achieving accurate information push.

Exemplarily, the acquiring the item feature in Step S101 includes: determining the item feature according to item data. Optionally, the item data includes any one or more of: category, title, abstract, author information, browsing level, forwarding level, and favorite level. CTR information of an item may be statistically obtained according to the browsing level, the forwarding level and the favorite level in the item data. It should be noted that the item data is not limited in this embodiment with regard to its specific data type and quantity, and those skilled in the art can make an adjustment to data for statistically obtaining the item's CTR information, if required.

In this embodiment, the item feature may be determined according to the item data (which may come from various major databases). Taking informational information as an example, any one or more of informational category, title, abstract, author information, browsing level, forwarding level, and favorite level may be obtained. The item feature reflecting the item information may be quickly constructed according to the item data, so that the item information that matches the user feature can be found subsequently, thereby achieving accurate information push.

Exemplarily, Step S102 may allow for constructing a user vector according to the user feature; constructing an item vector according to the item feature; and determining the degree of similarity between the user feature and the item feature according to a distance between the user vector and the item vector.

Figure 3:
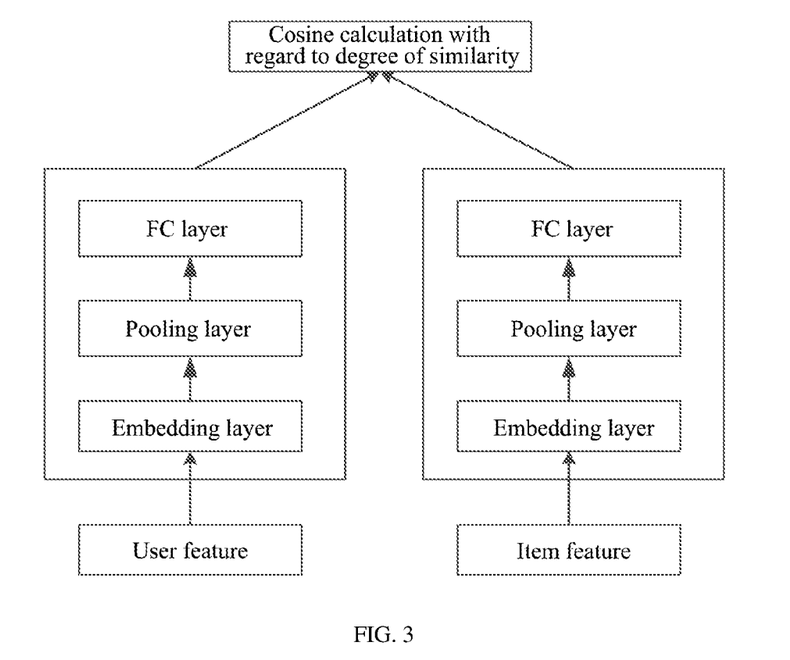
FIG. 3 is a schematic diagram of a model for calculating a degree of similarity according to the present application.

FIG. 3 a schematic diagram of a model for calculating a degree of similarity according to the present application. As shown in FIG. 3, the user feature is input into an Embedding layer (an embedding layer), a Pooling layer (a feature extraction layer), and a FC layer (a fully connected layer, FC for short) successively to obtain a user feature vector. The item feature is input into an Embedding layer (an embedding layer), a Pooling layer (a feature extraction layer), and a FC layer (a fully connected layer, FC for short) to obtain an item feature vector. Finally, a degree of similarity between the two feature vectors is calculated by Cosine (cosine). Among them, the Embedding layer is used to convert the user feature and the item feature into fixed-size vectors; the Pooling layer is used to perform feature extractions on the vectors to achieve dimensionality reduction for the vectors, so that subsequent vector computations and complexity are reduced; the FC layer functions as a classifier for mapping the extracted feature vectors to corresponding sample spaces. Finally, the user feature vector and the item feature vector, which belong to the same sample space, are performed with cosine calculation with regard to the degree of similarity so that the degree of similarity between the two feature vectors is obtained. This embodiment may allow for vectorizing the user feature and the item feature, and then calculating a degree of similarity between the user feature and the item feature according to a trained model. For example, a degree of similarity between any two semantic vectors is obtained by cosine. A distance between the user vector and the item vector reflects the degree of similarity between the user feature and the item feature. The closer the distance, the higher the corresponding degree of similarity. In this way, the item feature having a degree of similarity which is closest to the user feature may be found. Therefore, the item information that matches the user feature is conveniently searched based on the item feature.

Exemplarily, Step S103 may allow for acquiring item information corresponding to an item feature whose degree of similarity is ranked at top N, where N is a natural number greater than 0.

In this embodiment, since the click through rate CTR information is taken into consideration in constructing the item feature and the vector feature, the recalled item information meets a higher CTR requirement. In the whole process, there is no need to construct multiple recall models, and item information with consideration of multiple dimensional features may be acquired provided that a computation on a degree of similarity is performed between the item feature and the user feature, so that the item information can be ranked directly without comprehensive scoring, thereby simplifying a data processing procedure of information push and improving information push efficiency. Finally, item information corresponding to an item feature whose degree of similarity is ranked at top N is acquired, and these pieces of item information may be used as target items for recommendation to the user. For example, the item information whose degree of similarity is ranked at top 10 will be acquired and recommended to the user.

Exemplarily, Step S104 may allow for determining a user activity rating according to user behavior data; and determining a push strategy for the item information according to the user activity rating.

In this embodiment, the user activity may be rated according to the user behavior. Generally, the more the behavior data the user is corresponding to, the higher the user activity rating. The user behavior includes browsing, collecting, purchasing, blocking, giving a like, sharing, and other operations. Different information push strategies are used according to the user activity, which can improve a degree of matching between the item information and the user, so that the finally pushed item information better conforms to user needs.

In an optional manner, the determining the push strategy for the item information according to the user activity rating includes: if the user activity rating is greater than a preset rating, acquiring a point of interest of a user; when the item information matches the point of interest of the user, pushing the item information to the user terminal; and when the item information fails to match the point of interest of the user, not pushing the item information to the user terminal.

In this embodiment, when the user activity is greater than a preset rating, it indicates that the user behavior data is sufficient to determine a point of interest of a user, that is, the point of interest of the user is very clear, thus the item information can be displayed and verified through the point of interest of the user, so that the filtered item information can match the point of interest of the user.

In another optional manner, the determining the push strategy for the item information according to the user activity rating includes: when the user activity rating is not greater than a preset rating, pushing the item information to the user terminal directly.

In this embodiment, when the user activity rating is not greater than a preset rating, it indicates that the user behavior data is less and the point of interest of the user is not clear. At this time, it is necessary to perform generalized information push to the user, and further clarify the point of interest of the user based on information clicking and reading fed back from the user, so that accurate information push can be achieved and user experience can be improved during subsequent information push.

This embodiment allows for acquiring a user feature and an item feature, where both the user feature and the item feature include click through rate CTR information; determining a degree of similarity between the user feature and the item feature; determining, according to the degree of similarity, item information that is recalled; and pushing the item information to a user terminal, thereby overcoming the technical problem that the existing information push method is cumbersome and inefficient in procedure, and thus item information having a high CTR may be acquired through a one-channel recall approach, so that information push efficiency is improved and the pushed item information better conforms to user needs.

Figure 4:
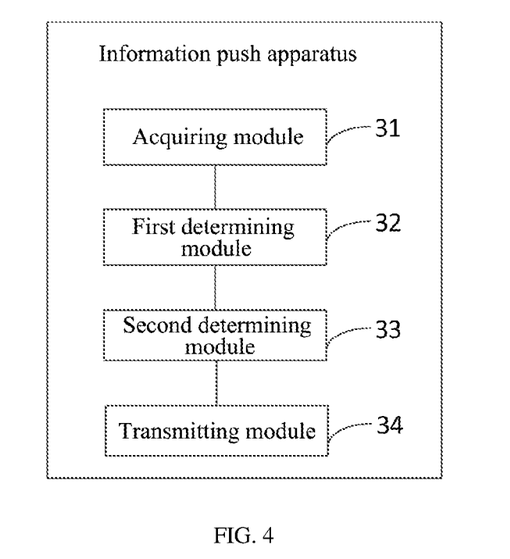
FIG. 4 is a schematic diagram according to a second embodiment of the present application.

FIG. 4 is a schematic diagram according to a second embodiment of the present application; as shown in FIG. 4, the apparatus in this embodiment may include:

an acquiring module 31, configured to acquire a user feature and an item feature, where both the user feature and the item feature include click through rate CTR information;

a first determining module 32, configured to determine a degree of similarity between the user feature and the item feature;

a second determining module 33, configured to determine, according to the degree of similarity, item information that is recalled; and a transmitting module 34, configured to push the item information to a user terminal.

This embodiment allows for: acquiring a user feature and an item feature that both include click through rate CTR information, then determining a degree of similarity between the user feature and the item feature; determining, according to the degree of similarity, item information that is recalled; and pushing the item information to a user terminal. Therefore, item information having a high CTR may be acquired through a one-channel recall approach, so that information push efficiency is improved and the pushed item information better conforms to user needs.

Optionally, the acquiring module 31 is specifically configured to:

determine the user feature according to user behavior data and user portrait data, where the user behavior data includes a browsing record, a favorite record, and a purchasing record; and the user portrait data includes any one or more of: age, gender, education level, consumption level, and occupation type; where CTR information of a user is statistically obtained according to the browsing record, the favorite record, and the purchasing record in the behavior data.

In this embodiment, the user feature may be determined according to user portrait data and user behavior data, such as a historical browsing record, favorite record, and purchasing record. Therefore, a feature reflecting a point of interest of the user and a user attribute may be obtained, so that item information matching the user feature can be found subsequently, thereby achieving accurate information push.

Optionally, the acquiring module 31 is specifically configured to:

determine the item feature according to item data, where the item data includes any one or more of: category, title, abstract, author information, browsing level, forwarding level, and favorite level; where CTR information of an item is statistically obtained according to the browsing level, the forwarding level and the favorite level in the item data.

In this embodiment, the item feature is determined according to the item data (which may come from various major databases). Taking informational information as an example, any one or more of informational category, title, abstract, author information, browsing level, forwarding level, and favorite level may be obtained. Therefore, the item feature reflecting the item information may be constructed, so that the item information that matches the user feature can be found subsequently, thereby achieving accurate information push.

Optionally, the first determining module 32 is specifically configured to:

construct a user vector according to the user feature;
construct an item vector according to the item feature; and
determine the degree of similarity between the user feature and the item feature according to a distance between the user vector and the item vector.

This embodiment may allow for vectorizing the user feature and the item feature, and then calculating a degree of similarity between the user feature and the item feature according to a trained model. For example, a degree of similarity between any two semantic vectors is obtained by cosine. A distance between the user vector and the item vector reflects the degree of similarity between the user feature and the item feature. The closer the distance, the higher the corresponding degree of similarity. In this way, the item feature having a degree of similarity which is closest to the user feature may be found. Therefore, the item information that matches the user feature is conveniently searched based on the item feature.

Optionally, the second determining module 33 is specifically configured to:

acquire item information corresponding to an item feature whose degree of similarity is ranked at top N, where N is a natural number greater than 0.

In this embodiment, since the click through rate CTR information is taken into consideration in constructing the item feature and the vector feature, the recalled item information meets a higher CTR requirement. In the whole process, there is no need to construct multiple recall models, and item information with consideration of multiple dimensional features may be acquired provided that a computation on a degree of similarity is performed between the item feature and the user feature, so that the item information can be ranked directly without comprehensive scoring, thereby simplifying a data processing procedure of information push and improving information push efficiency.

Optionally, the transmitting module 34 is specifically configured to:

determine a user activity rating according to user behavior data; and determine a push strategy for the item information according to the user activity rating.

In this embodiment, the user activity may be rated according to the user behavior. Generally, the more the behavior data the user is corresponding to, the higher the user activity rating. Different information push strategies are used according to the user activity, which can improve a degree of matching between the item information and the user, so that the finally pushed item information better conforms to user needs.

Optionally, the transmitting module 34 is specifically configured to:

if the user activity rating is greater than a preset rating, acquire a point of interest of a user;
when the item information matches the point of interest of the user, push the item information to the user terminal; and
when the item information fails to match the point of interest of the user, not push the item information to the user terminal.

In this embodiment, when the user activity is greater than a preset rating, it indicates that the user behavior data is sufficient to determine a point of interest of a user, that is, the point of interest of the user is very clear, thus the item information can be displayed and verified through the point of interest of the user, so that the filtered item information can match the point of interest of the user.

Optionally, the transmitting module 34 is specifically configured to:

when the user activity rating is not greater than a preset rating, push the item information to the user terminal directly.

In this embodiment, when the user activity rating is not greater than a preset rating, it indicates that the user behavior data is less and the point of interest of the user is not clear. At this time, it is necessary to perform generalized information push to the user, and further clarify the point of interest of the user based on information clicking and reading fed back from the user, so that accurate information push can be achieved and user experience can be improved during subsequent information push.

The information push apparatus in this embodiment can implement the technical solution in the method shown in FIG. 2. For specific implementation processes and technical principles, reference may be made to the related description in the method shown in FIG. 2, and details will not be described here again.

This embodiment allows for acquiring a user feature and an item feature, where both the user feature and the item feature include click through rate CTR information; determining a degree of similarity between the user feature and the item feature; determining, according to the degree of similarity, item information that is recalled; and pushing the item information to a user terminal, thereby overcoming the technical problem that the existing information push method is cumbersome and inefficient in procedure, and thus item information having a high CTR may be acquired through a one-channel recall approach, so that information push efficiency is improved and the pushed item information better conforms to user needs.

Figure 5:
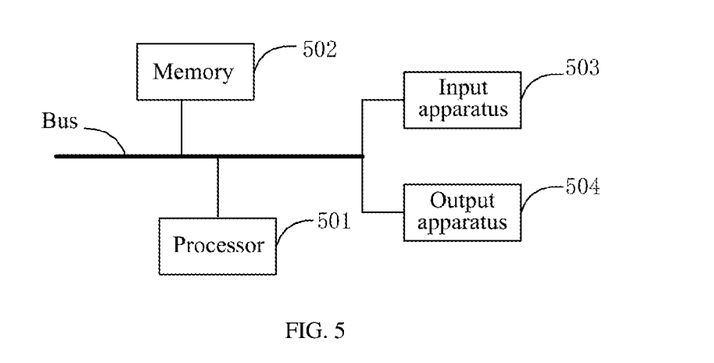
FIG. 5 is a block diagram of an electronic device for implementing an embodiment of the present application.

FIG. 5 is a block diagram of an electronic device for implementing an embodiment of the present application; as shown in FIG. 5, it is a block diagram of the electronic device of FIG. 5 according to the embodiment of the present application. The electronic device is intended to represent various forms of digital computers, such as a laptop computer, a desktop computer, a workbench, a personal digital assistant, a server, a blade server, a mainframe computer, and other suitable computers. The electronic device may also represent various forms of mobile apparatuses, such as a personal digital assistant, a cellular phone, a smart phone, a wearable device, and other similar computing apparatuses. The components shown herein, their connections and relationships, and their functions are merely as examples, and are not intended to limit implementations in the present application described and/or claimed herein.

As shown in FIG. 5, the electronic device includes: one or more processors 501, a memory 502, and an interface for connecting various components, including a high-speed interface and a low-speed interface. The various components are connected to each other via different buses, and can be installed on a public motherboard or installed in other ways as desired. The processor may process instructions executed within the electronic device, including instructions that stored in or on the memory to display GUI graphical information on an external input/output apparatus (such as a display device coupled to the interface). In other embodiments, multiple processors and/or multiple buses can be used together with multiple memories, if desired. Similarly, multiple electronic devices can be connected, and each device provides some necessary operations (for example, as a server array, a group of blade servers, or a multi-processor system). In FIG. 5, one processor 501 is used as an example.

The memory 502 is a non-transitory computer readable storage medium provided in the present application. Among them, the memory is stored with instructions executable by at least one processor, enabling the at least one processor to execute the information push method provided in the present application, as shown in FIG. 5. The non-transitory computer readable storage medium of the present application is stored with computer instructions, which are configured to enable a computer to execute the information push method provided in the present application, as shown in FIG. 5.

As a kind of non-transitory computer readable storage medium, the memory 502 may be configured to store non-transitory software programs, non-transitory computer executable programs and modules, such as program instructions/modules corresponding to the information push method of FIG. 5 in the embodiments of the present application. The processor 501 executes various functional applications and data processing of the server by running the non-transitory software programs, instructions, and modules stored in the memory 502, thereby achieving the information push method of FIG. 5 in the above method embodiments.

The memory 502 may include a program storage area and a data storage area, where the program storage area may be stored with an operating system and an application program required by at least one function, the data storage area may be stored with data created according to use of the electronic device of FIG. 5, and so on. In addition, the memory 502 may include a high-speed random access memory, and may also include a non-transitory memory, such as at least one magnetic disk storage device, a flash memory device, or other non-transitory solid-state storage devices. In some embodiments, the memory 502 optionally includes memories remotely arranged relative to the processor 501, and these remote memories can be connected to the electronic device of FIG. 5 through a network. Examples of the above network include, but are not limited to, Internet, an intranet, a local area network, a mobile communication network, and a combination thereof.

The electronic device of FIG. 5 may also include: an input apparatus 503 and an output apparatus 504. The processor 501, the memory 502, the input apparatus 503 and the output apparatus 504 can be connected by a bus or in other ways. In FIG. 5, connections via buses are used as an example.

The input apparatus 503 may receive input digital or character information, and generate key signal input related to user settings and function control of the electronic device of FIG. 5, such as a touch screen, a keypad, a mouse, a trackpad, a touchpad, an indicator bar, one or more mouse buttons, a trackball, a joystick and other input apparatuses. The output apparatus 504 may include a display device, an auxiliary lighting apparatus (e. g., an LED), a tactile feedback apparatus (e.g., a vibration motor), and so on. The display device may include, but is not limited to, a liquid crystal display (LCD), a light emitting diode (LED) display, and a plasma display. In some implementations, the display device may be the touch screen.

Various implementations of the system and the technique described here may be implemented in a digital electronic circuit system, an integrated circuit system, an ASIC (application specific integrated circuit), a GPU (graphic processing unit), an FPGA (field programmable gate array) device, computer hardware, firmware, software, and/or a combination thereof. These various implementations may include: implementations implemented in one or more computer programs, where the one or more computer programs may be executed and/or interpreted on a programmable system including at least one programmable processor, and the programmable processor may be a dedicated or generic programmable processor, which may receive data and instructions from a storage system, at least one input apparatus and at least one output apparatus, and transmit the data and the instructions to the storage system, the at least one input apparatus and the at least one output apparatus.

These computer programs (also known as programs, software, software applications, or codes) include machine instructions of the programmable processor, and may be implemented using a high-level process and/or an object-oriented programming language, and/or an assembly/machine language. As used herein, the terms "machine readable medium" and "computer readable medium" refer to any computer program product, device, and/or apparatus (e.g., a magnetic disk, an optical disk, a memory, a programmable logic device (PLD)) configured to provide machine instructions and/or data to the programmable processor, including a machine readable medium that receives machine instructions as machine readable signals. The term "machine readable signal" refers to any signal configured to provide machine instructions and/or data to the programmable processor.

For provision of interaction with a user, the system and the technique described herein may be implemented on a computer, and the computer has: a display device for displaying information to the user (such as a CRT (cathode ray tube) or an LCD (liquid crystal display) monitor); and a keyboard and a pointing apparatus (such as a mouse or a trackball), the user may provide an input to the computer through the keyboard and the pointing apparatus. Other kinds of apparatuses may also be used to provide the interaction with the user; for example, feedback provided to the user may be any form of sensor feedback (e.g., visual feedback, auditory feedback, or tactile feedback); and may receive the input from the user in any form (including an acoustic input, a voice input, or a tactile input).

The system and the technique described herein may be implemented in a computing system that includes back-end components (for example, as a data server), or a computing system that includes intermediate components (for example, an application server), or a computing system that includes front-end components (for example, a user computer with a graphical user interface or a web browser through which the user may interact with the implementations of the systems and the techniques described herein), or a computing system that includes any combination of the back-end components, the intermediate components, or the front-end components. The components of the system may be interconnected by any form or medium of digital data communications (e.g., a communication network). Examples of the communication network include: a local area network (LAN), a wide area network (WAN), and Internet.

The computing system may include a client and a server. The client and the server are generally far away from each other, and generally interact with each other through the communication network. A relationship between the client and the server is generated by computer programs running on a corresponding computer and having a client-server relationship for each other.

An embodiment of the present application provides a computer readable storage medium having, stored thereon, computer instructions which, when executed by a processor, execute the information push method provided in the above embodiments.

An embodiment of the present application provides a program product including a computer program, where the computer program is stored in a readable storage medium from which at least one processor of a server can read the computer program, and the at least one processor executes the computer program to enable the server to execute the information push method provided in the above embodiments.

An embodiment of the present application provides a computer program including program codes, where when a computer runs the computer program, the program codes execute the information push method provided in the above embodiments.

It should be understood that the various forms of procedures shown above can be used, and reordering, addition, or deletion of the step can be performed. For example, the steps recorded in the present application can be performed concurrently, sequentially, or in different orders, provided that desirable results of the technical solutions disclosed in the present application could be achieved, and there is no limitation herein.

The above specific embodiments do not constitute a limitation on the protection scope of the present application. Those skilled in the art should understand that various modifications, combinations, sub-combinations, and replacements can be made according to design requirements and other factors. Any modification, equivalent replacement and improvement, etc., made within the spirit and principle of the present application shall be included in the protection scope of the present application.

What is claimed is:

1. An information push method, comprising:
acquiring a user feature and an item feature, wherein the user feature comprises click through rate (CTR) information of the user, the CTR information of the user is statistically obtained according to user behavior data in a recall stage, and the item feature comprises CTR information of the item, wherein the CTR information of the item is statistically obtained according to item data in the recall stage;
determining a degree of similarity between the user feature and the item feature;
determining, according to the degree of similarity, item information that is recalled, wherein the item information comprises information that meets a user's needs in intelligent search technology; and
pushing the item information to a user terminal;
wherein the determining the degree of similarity between the user feature and the item feature comprises:
inputting the user feature into a first embedding layer, a first pooling layer, and a first fully connected layer successively to obtain a user feature vector, wherein the first embedding layer is used to convert the user feature into first fixed-size vectors, the first pooling layer is used to perform feature extraction on the first fixed-size vectors to obtain first extracted feature vectors, and the first fully connected layer is used for mapping the first extracted feature vectors to first corresponding sample spaces to obtain the user feature vector;
inputting the item feature into a second embedding layer, a second pooling layer, and a second fully connected layer successively to obtain an item feature vector, wherein the second embedding layer is used to convert the item feature into second fixed-size vectors, the second pooling layer is used to perform feature extraction on the second fixed-size vectors to obtain second extracted feature vectors, and the second fully connected layer is used for mapping the second extracted feature vectors to second corresponding sample spaces to obtain the item feature vector; and
calculating the degree of similarity between the user feature vector and the item feature vector by cosine.

2. The method according to claim 1, wherein the determining the degree of similarity between the user feature and the item feature comprises:
constructing a user vector according to the user feature;
constructing an item vector according to the item feature; and
determining the degree of similarity between the user feature and the item feature according to a distance between the user vector and the item vector.

3. The method according to claim 1, wherein the determining, according to the degree of similarity, the item information that is recalled comprises:
acquiring item information corresponding to an item feature whose degree of similarity is ranked at top N, wherein N is a natural number greater than 0.

4. The method according to claim 1, wherein the acquiring the user feature comprises:
determining the user feature according to the user behavior data and user portrait data.

5. The method according to claim 4, wherein the user behavior data comprises a browsing record, a favorite record, and a purchasing record; and the user portrait data comprises any one or more of: age, gender, education level, consumption level, and occupation type.

6. The method according to claim 1, wherein the acquiring the item feature comprises:
determining the item feature according to the item data.

7. The method according to claim 6, wherein the item data comprises any one or more of: category, title, abstract, author information, browsing level, forwarding level, and favorite level.

8. The method according to claim 1, wherein the pushing the item information to the user terminal comprises:
determining a user activity rating according to the user behavior data; and
determining a push strategy for the item information according to the user activity rating.

9. The method according to claim 8, wherein the determining the push strategy for the item information according to the user activity rating comprises:
    if the user activity rating is greater than a preset rating, acquiring a point of interest of a user;
    when the item information matches the point of interest of the user, pushing the item information to the user terminal; and
    when the item information fails to match the point of interest of the user, not pushing the item information to the user terminal.

10. The method according to claim 8, wherein the determining the push strategy for the item information according to the user activity rating comprises:
    when the user activity rating is not greater than a preset rating, pushing the item information to the user terminal directly.

11. An electronic device, comprising:
    at least one processor; and
    a memory, communicatively connected to the at least one processor;
    wherein the memory is stored with instructions executable by the at least one processor, and the instructions are executed by the at least one processor to enable the at least one processor to:
    acquire a user feature and an item feature, wherein the user feature comprises click through rate (CTR) information of the user, the CTR information of the user is statistically obtained according to user behavior data in a recall stage, and the item feature comprises CTR information of the item, wherein the CTR information of the item is statistically obtained according to item data in the recall stage;
    determine a degree of similarity between the user feature and the item feature;
    determine, according to the degree of similarity, item information that is recalled, wherein the item information comprises information that meets a user's needs in intelligent search technology; and
    push the item information to a user terminal;
    wherein when determining the degree of similarity between the user feature and the item feature, the at least one processor is specifically enabled to:
    input the user feature into a first embedding layer, a first pooling layer, and a first fully connected layer successively to obtain a user feature vector, wherein the first embedding layer is used to convert the user feature into first fixed-size vectors, the first pooling layer is used to perform feature extraction on the first fixed-size vectors to obtain first extracted feature vectors, and the first fully connected layer is used for mapping the first extracted feature vectors to first corresponding sample spaces to obtain the user feature vector;
    input the item feature into a second embedding layer, a second pooling layer, and a second fully connected layer successively to obtain an item feature vector, wherein the second embedding layer is used to convert the item feature into second fixed-size vectors, the second pooling layer is used to perform feature extraction on the second fixed-size vectors to obtain second extracted feature vectors, and the second fully connected layer is used for mapping the second extracted feature vectors to second corresponding sample spaces to obtain the item feature vector; and
    calculate the degree of similarity between the user feature vector and the item feature vector by cosine.

12. The electronic device according to claim 11, wherein the instructions are executed by the at least one processor to enable the at least one processor to:
    construct a user vector according to the user feature;
    construct an item vector according to the item feature; and
    determine the degree of similarity between the user feature and the item feature according to a distance between the user vector and the item vector.

13. The electronic device according to claim 11, wherein the instructions are executed by the at least one processor to enable the at least one processor to:
    acquire item information corresponding to an item feature whose degree of similarity is ranked at top N, wherein N is a natural number greater than 0.

14. The electronic device according to claim 11, wherein the instructions are executed by the at least one processor to enable the at least one processor to:
    determine the user feature according to the user behavior data and user portrait data.

15. The electronic device according to claim 14, wherein the user behavior data comprises a browsing record, a favorite record, and a purchasing record; and the user portrait data comprises any one or more of: age, gender, education level, consumption level, and occupation type.

16. The electronic device according to claim 11, wherein the instructions are executed by the at least one processor to enable the at least one processor to:
    determine the item feature according to the item data;
    wherein the item data comprises any one or more of: category, title, abstract, author information, browsing level, forwarding level, and favorite level.

17. The electronic device according to claim 11, wherein the instructions are executed by the at least one processor to enable the at least one processor to:
    determine a user activity rating according to the user behavior data; and
    determine a push strategy for the item information according to the user activity rating.

18. The electronic device according to claim 17, wherein the instructions are executed by the at least one processor to enable the at least one processor to:
    if the user activity rating is greater than a preset rating, acquire a point of interest of a user;
    when the item information matches the point of interest of the user, push the item information to the user terminal; and
    when the item information fails to match the point of interest of the user, not push the item information to the user terminal.

19. The electronic device according to claim 17, wherein the instructions are executed by the at least one processor to enable the at least one processor to:
    when the user activity rating is not greater than a preset rating, push the item information to the user terminal directly.

20. An information push method, comprising:
    determining a degree of similarity between a user feature and an item feature, wherein the user feature comprises click through rate (CTR) information of the user, the CTR information of the user is statistically obtained according to user behavior data in a recall stage, and the item feature comprises CTR information of the item, wherein the CTR information of the item is statistically obtained according to item data in the recall stage;
    determining, according to the degree of similarity, item information that is recalled, wherein the item information comprises information that meets a user's needs in intelligent search technology; and pushing the item information to a user terminal;

wherein the determining the degree of similarity between the user feature and the item feature comprises:

inputting the user feature into a first embedding layer, a first pooling layer, and a first fully connected layer successively to obtain a user feature vector, wherein the first embedding layer is used to convert the user feature into first fixed-size vectors, the first pooling layer is used to perform feature extraction on the first fixed-size vectors to obtain first extracted feature vectors, and the first fully connected layer is used for mapping the first extracted feature vectors to first corresponding sample spaces to obtain the user feature vector;

inputting the item feature into a second embedding layer, a second pooling layer, and a second fully connected layer successively to obtain an item feature vector, wherein the second embedding layer is used to convert the item feature into second fixed-size vectors, the second pooling layer is used to perform feature extraction on the second fixed-size vectors to obtain second extracted feature vectors, and the second fully connected layer is used for mapping the second extracted feature vectors to second corresponding sample spaces to obtain the item feature vector; and calculating the degree of similarity between the user feature vector and the item feature vector by cosine.

* * * * *